United States Patent [19]

Liebman

[11] 4,248,927
[45] Feb. 3, 1981

[54] INSULATING COMPOSITION

[76] Inventor: Bernard S. Liebman, 7 Talman Pl., Dix Hills, N.Y. 11746

[21] Appl. No.: 61,920

[22] Filed: Jul. 30, 1979

[51] Int. Cl.³ .............................................. B32B 5/06
[52] U.S. Cl. .................... 428/284; 28/112; 428/227; 428/248; 428/299; 428/300
[58] Field of Search ............. 428/284, 287, 298, 299, 428/300, 297, 302, 280; 8/115.7

[56] References Cited

U.S. PATENT DOCUMENTS

| | | | |
|---|---|---|---|
| 1,714,240 | 5/1929 | Rayner | 156/148 |
| 2,314,482 | 3/1943 | De Fries | 428/300 |
| 2,339,431 | 1/1944 | Slayter | 428/213 |
| 2,958,919 | 11/1960 | Palmer | 28/260 |
| 3,046,173 | 7/1962 | Copeland | 428/175 |
| 3,461,026 | 8/1969 | Schick | 428/300 |

FOREIGN PATENT DOCUMENTS 364703  12/1976  U.S.S.R. .................................. 428/300

*Primary Examiner*—James J. Bell
*Attorney, Agent, or Firm*—Gottlieb, Rackman & Reisman

[57] ABSTRACT

There are disclosed apparatus and methods for incorporating feathers and downs into synthetic fiber. In one embodiment, raw polyester staple is processed into batting by a garnetting machine or the like, after which a quantity of natural feathers and downs is securely implanted in the polyester fiber using an impregnation device. The polyester sheets containing the impregnated plumage may then be folded and cut to the required size and thickness for further use.

1 Claim, 7 Drawing Figures

INSULATING COMPOSITION

This invention relates generally to the use of the plumage of waterfowl in consumer products such as clothing, pillows, bedding and furniture, and more specifically, to apparatus and methods for combining feathers and downs with synthetic fiber to create a web of insulating material which may be used in the aforementioned articles.

The historical use of waterfowl plumage, namely feathers and downs, to fill and insulate clothing, pillows, comforters, sleeping bags and the like, thereby enhancing the softness and warmth of such items, is well-known. However, due to the increased availability of inexpensive polyester fiberfill products, the use of natural feathers and down for insulating purposes has declined over the last several decades in favor of these synthetic materials.

Although the use of polyester fibers to insulate outerwear garments and bedding has become widespread, the insulating properties of these synthetic products are inferior to those of the more expensive natural feathers and downs which were previously used. This factor, together with a recent popular trend towards use of natural rather than synthetic products, has generated a resurgence of consumer interest in natural feathers and downs, and has created a demand for an insulating material which combines the relatively low cost of synthetic polyesters with the more favorable insulating properties of natural feathers and downs.

Although attempts have been made to blend synthetics such as polyester with the natural plumage, these methods have met with limited success. For example, short pieces of polyester filament have in the past been combined loosely with natural feathers and downs, forming a nonhomogeneous mixture having several undesirable properties. Specifically, such a synthetic mixture cannot be introduced homogeneously into a garment or other article using the same equipment which is now commonly used with the natural products alone. Moreover, once this synthetic mixture is placed into a garment and the garment is laundered, the mixture tends to separate after several washings into its component parts, forming "bundles" of feathers and downs throughout the material. This lack of homogeneity may not only detract from the appearance and usefulness of the article, but it may also lead, in turn, to potential legal liability on the part of the manufacturer of the article in which the mixture is used, since inaccurate labeling of such a garment may result if homogeneity is not maintained, and the physical properties of the ingredients of such a mixture are such as to make uniformity virtually impossible.

In summary, the prior art has failed to develop an insulating material which combines natural feathers and downs with synthetic fibers, creating a product which is commercially acceptable for use in a garment or other article.

Accordingly, it is the principal object of this invention to provide apparatus and methods for incorporating feathers and downs into synthetic fibers which yield a homogeneous insulating product having a substantially uniform distribution of feathers and downs throughout the entire product.

Another object of this invention is to provide apparatus and methods for incorporating feathers and downs into synthetic fiber yielding an insulating product which will resist separation into its component ingredients after repeated laundering.

Still another object of this invention is to provide apparatus and methods for incorporating feathers and downs into synthetic fiber producing an insulating material of uniform loft and warmth throughout.

Briefly, in accordance with the principles of this invention, an apparatus and method for incorporating feathers and downs directly into sheets of synthetic fiber includes the conventional processing of synthetic polyester filament by a garnetting machine or the like, producing two continuous sheets of polyester web. A charge of natural feathers and downs is introduced between the polyester webs, after which one web is superimposed over the other web to form a single sheet. This sheet is then fed to an impregnation device, which securely implants the feathers and downs in the polyester fiber. Thereafter, the polyester sheets containing the impregnated plumage are folded to produce the required thickness for use in a garment or other article, and the product may then be cut to the required size.

In an alternative embodiment of this invention, a carding machine is used, rather than a garnetting machine, to process the staple polyester filament, in which case the natural plumage is fed directly into the carding machine together with the polyester filament. A single web containing the polyester and plumage mixture is drawn from the carding machine and is directly folded to the required thickness and cut to the required size. In this embodiment, there is no need to include an impregnation step, since the implantation of the plumage in the polyester web is accomplished as a by-product of the carding process.

It is therefore a feature of an embodiment of this invention that natural feathers and downs are homogeneously blended into a synthetic fiber, rather than being mixed with the fiber in a non-homogeneous fashion.

Another feature of an embodiment of this invention is that the natural plumage is blended homogeneously into long flat sheets of fiber which may be cut to size and used directly in garments or other articles, thereby eliminating the necessity of "blowing" the synthetic mixture into the article.

Further objects, features and advantages of this invention will become more readily apparent from an examination of the following specification when taken in conjunction with the accompanying drawings, wherein.

Figures 1, 5:
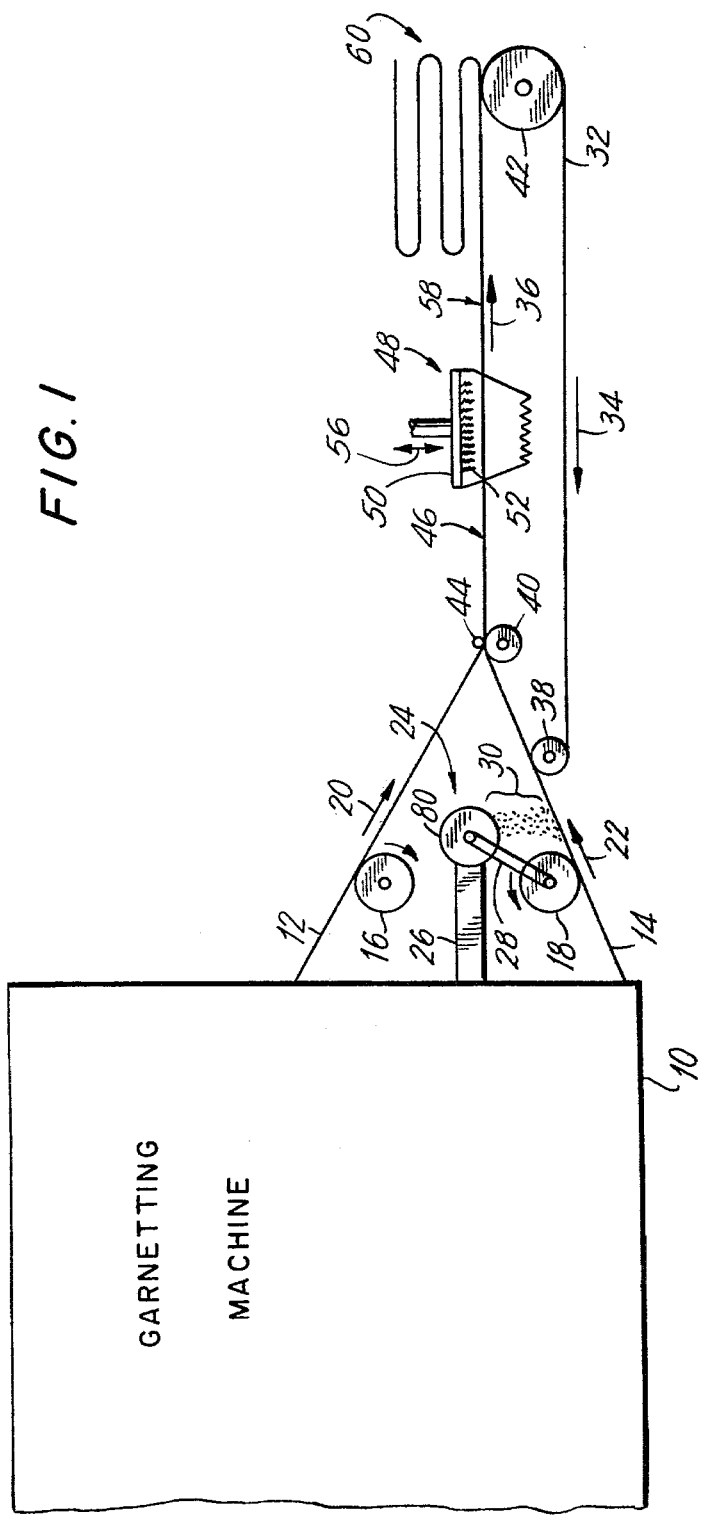
FIG. 1 is a schematic diagram of the process by which the feathers and downs are incorporated into synthetic fiber in a preferred embodiment of the present invention.
FIG. 5 is a perspective view, partially in cross-section, which illustrates how the product shown in FIG. 4 may be used.

Referring now to the drawings, and specifically to FIG. 1, a garnetting machine, which is a commercially available apparatus for processing staple into batting, is represented by block 10. The use of a garnetting machine to open raw polyester fiber and then comb it into even webs layered to a specific weight and width is well known in the art and, therefore, the construction and operation of the garnetting machine 10 are not shown in detail.

The raw polyester staple (not shown) is processed within the garnetting machine 10, producing two polyester webs 12, 14 which exit separately therefrom. Polyester webs 12, 14 are each approximately one mil thick, and each comprises a single layer of polyester batting.

After exiting from garnetting machine 10, polyester webs 12, 14 pass over feed rollers 16, 18 which are rotated by drive means (not shown). In operation, as feed rollers 16, 18 are rotated, polyester webs 12, 14 are advanced along their paths from garnetting machine 10 in the direction shown by arrows 20, 22.

The apparatus of FIG. 1 further includes means for dispensing a charge of waterfowl plumage between the polyester webs. A plumage-dispensing unit, generally designated 24, is positioned on shelf 26, beneath polyester web 12 and above polyester web 14. The preferred embodiment of plumage-dispensing unit 24 includes plumage reservoir means, shown illustratively in FIG. 7 as a plumage reservoir 66, which is preferably cylindrical in shape and which includes a longitudinal discharge vent 67 and a stationary inner shell 68 containing a supply of feathers and downs 30. Inner shell 68 has a longitudinal dispensing window 70, which is oriented downwardly as shown in FIG. 7, and a similar longitudinal loading window 72, which is located opposite dispensing window 70 and is oriented upwardly.

Inner shell 68 is surrounded by and encased within a rotatable outer shell 74 having a longitudinal opening 76 and a hinged loading door 78 which is located opposite opening 76 along the periphery of outer shell 74. As shown in FIG. 7, outer shell 74 may be positioned such that the opening 76 is aligned with the dispensing window 70 of inner shell 68, creating discharge vent 67 and simultaneously causing loading door 78 to overlie loading window 72, to provide access to the interior of inner shell 68 when loading door 78 is opened.

Plumage-dispensing unit 24 further includes metering means, which may illustratively comprise a rotatable metering cylinder 80 surrounding plumage reservoir 66 and having four longitudinal dispensing apertures 82, spaced at 90° intervals of arc around the periphery of the metering cylinder 80. As shown in FIG. 7, the width of each dispensing aperture 82 is generally comparable to the width of opening 76 of outer shell 74, which is in turn comparable to the width of dispensing window 70 of inner shell 68. Similarly, the width of each dispensing aperture 82 is also generally comparable to the width of loading door 78, which in turn is comparable to the width of loading window 72.

Figure 7:
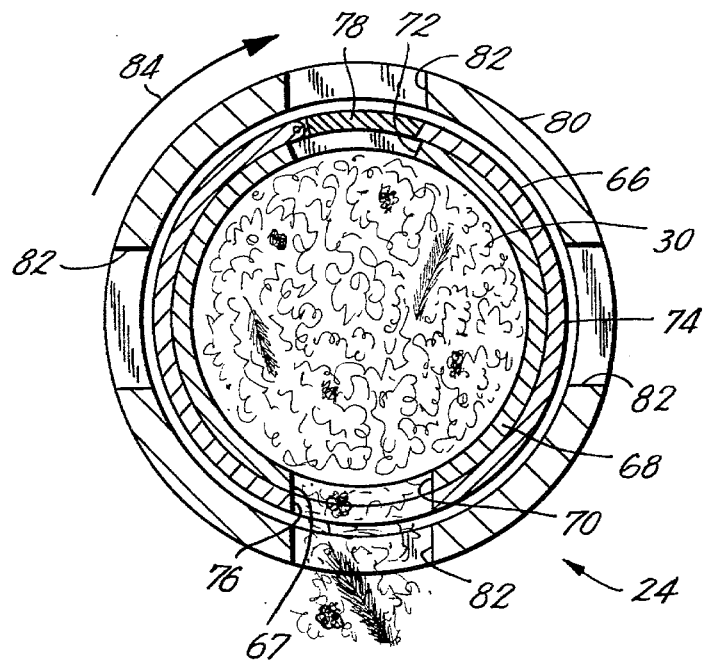
FIG. 7 is an enlarged cross-sectional view of a plumage-dispensing unit for use with the present invention.

In operation, a change of feather and downs 30 may be introduced into plumage reservoir 66 through loading door 78 from a bulk source (not shown) when inner shell 68, outer shell 74 and metering cylinder 80 are positioned as shown in FIG. 7. After loading down door 78 has been secured in the closed position by a suitable latch mechanism (not shown), outer shell 74 may be rotated slightly relative to inner shell 68, thereby moving opening 76 slightly out of alignment with dispensing window 70. In this manner, the quantity of feathers and downs 30 which will ultimately be dispensed from plumage-dispensing unit 24 can be adjusted as needed, depending upon the insulating properties desired in the final product. For example, the maximum quantity of feathers and downs 30 will be released from inner shell 68 when outer shell 74 is positioned as shown in FIG. 7. However, a reduction in the discharge of plumage can be effected by rotating outer shell 74 to reduce the overall width of the discharge vent 67 created by the alignment of opening 76 and dispensing window 70. If outer shell 74 is rotated still further, opening 76 will eventually be carried completely out of alignment with dispensing window 70, thereby effectively closing the discharge vent 67, and shutting down plumage-dispensing unit 24 if that should become necessary during the operation of the apparatus illustrated in FIG. 1.

After outer shell 74 is positioned in the desired orientation, metered quantities of plumage may be released at regular intervals from plumage reservoir 66 by virtue of the rotation of metering cylinder 80 in the direction of arrow 84 in FIG. 7. As shown in FIG. 1, metering cylinder 80 is linked to feed roller 18 by means of a drive belt 28. As feed roller 18 is rotated by the aforementioned drive means (not shown), this motion is transferred by belt 28 to metering cylinder 80, causing a metered quantity of feathers and downs 30 to be dispensed from plumage reservoir 66 each time a dispensing aperture 82 of cylinder 80 rotates into alignment with discharge vent 67 of plumage reservoir 66.

The feathers and downs 30 which are dispensed by the dispensing unit 24 are drawn downwards as viewed in FIG. 1 by gravitational action, and are spread evenly over polyester sheet 14. The quantity of plumage which is dispensed must be sufficient to constitute in the range of 10–25 percent by weight of the final plumage-polyester product. This is the optimum range for the quantity of plumage added. If more than 25 percent plumage is used, the excess weight of the plumage may collapse the polyester web onto which it falls. On the other hand, if less than 10 percent plumage is used, the additional insulating properties which would be imparted to the final product by the plumage would be negligible.

After receiving a quantity of feathers and downs 30, polyester web 14 is further advanced along its path from garnetting machine 10 by a conveyor belt 32. Conveyor belt 32 is driven in the direction shown by arrows 34,36 by rollers 38, 40 and 42, at least one of which is rotated by drive means (not shown), and complementary pressure is provided by roller 44. Conveyor belt 32 is in contact with the underside of polyester web 14, and carries it towards rollers 40 and 44.

Figure 2:
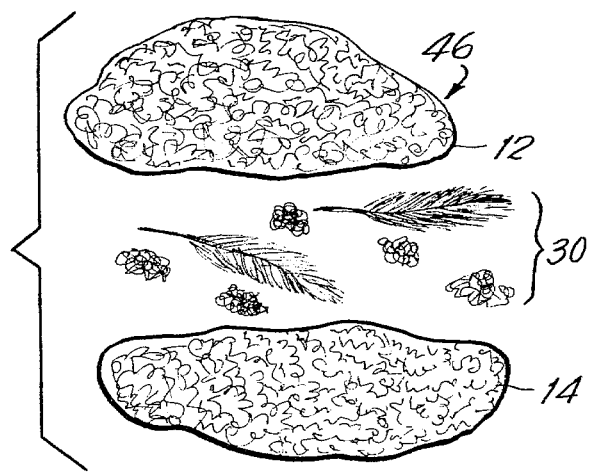
FIG. 2 is an exploded view of the feathers and downs between two polyester webs.

Polyester web 14, bearing feathers and downs 30, then passes between rollers 40, 44. Polyester web 12 is simultaneously fed between rollers 40, 44 so as to overlie polyester web 12 and feathers and downs 30, with webs 12 and 14 traveling in a congruent relationship after they pass between rollers 40, 44. In this composite form, designated 46 and shown most clearly in schematic form in FIGS. 2 and 3, webs 12 and 14 and feathers and downs 30 approach the impregnation unit, generally designated 48.

Figure 3:
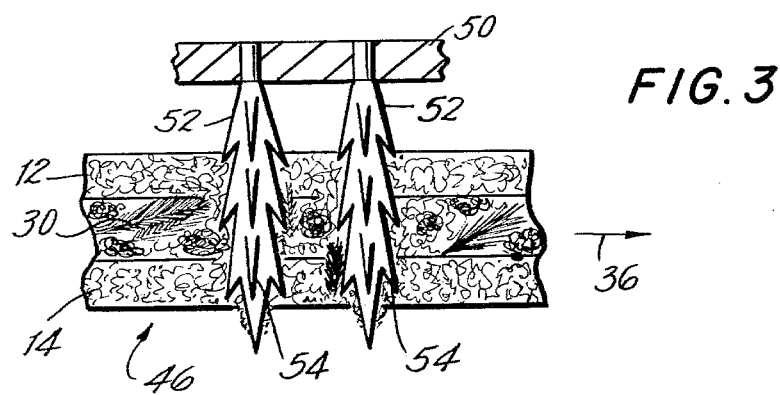
FIG. 3 is an enlarged view of the needling process by which the plumage is implanted into the polyester fiber.

In the preferred embodiment, impregnation unit 48 comprises a reciprocable shelf 50 to which a plurality of barbed needles 52 are attached. Shelf 50 is adapted to reciprocate vertically, as shown by arrow 56, in response to conventional drive means (not shown), carrying needles 52 vertically into and out of contact with composite web 46. The needles may be arranged in rows and uniformly spaced. As shown in FIG. 3, each needle 52 is formed with a multiplicity of downwardly projecting barbs 54.

Figure 4:
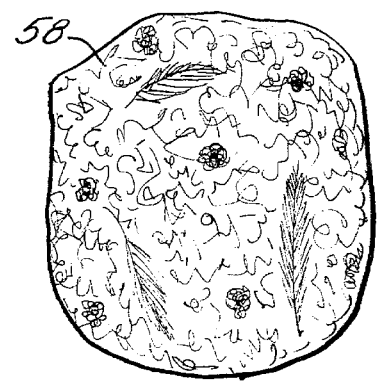
FIG. 4 is an enlarged view of a portion of the insulating material produced with the invention.

In order to effect implantation of the feathers and downs 30, the composite web 46 is subjected to repeated perforation by barbed needles 52. As the composite web 46 is carried by conveyor belt 32 in the direction of arrow 36, needles 52 descend and punch the web. Each needle 52 draws a portion of polyester web 12 downwardly, causing the fibers to surround and interlace with one or more feathers and downs 30. As the needles 52 are pushed further through the web 46, some of the fibers from web 12 are pulled further downwardly into polyester web 14. The resulting product is a vertically integrated web 58, shown in FIG. 4, in which the polyester fibers are thoroughly entangled with the plumage.

After passage through impregnation unit 48, the vertically integrated web 58 is carried by conveyor belt 32, and is fed to an appropriate folding apparatus, generally designated 60. Apparatus for folding polyester batting to produce a required thickness are well known in the art, and therefore this unit is shown only in schematic form. The vertically integrated web 58 is preferably folded to a final thickness in the range of 20 millimeters to 50 millimeters, comprising between 10 and 20 layers of the web. It is then fed to an appropriate storage location (not shown) for cutting or other suitable processing.

As shown illustratively in FIG. 5, the web 58 may be cut for use as insulation in a clothing garment, such as the sleeve 62 of a jacket, wherein the integrated plumage-polyester product furnishes the necessary warmth and loft.

Figure 6:
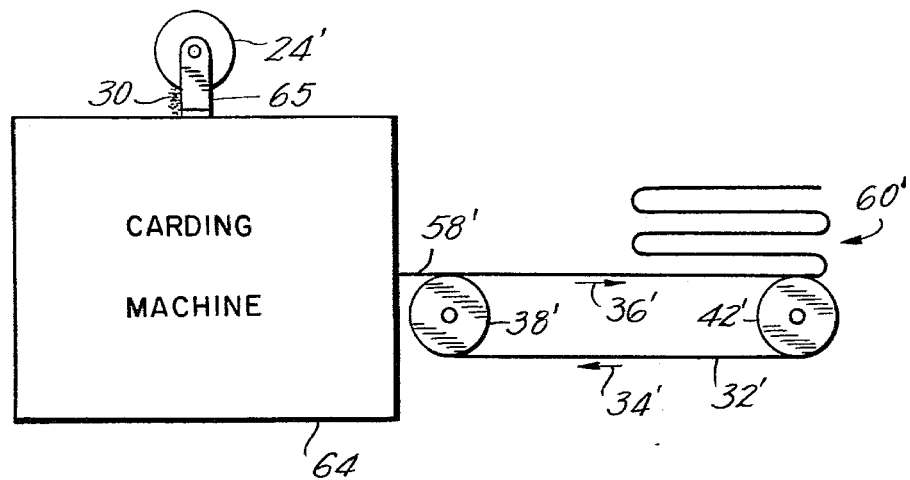
FIG. 6 is a schematic diagram illustrating an alternative embodiment of the present invention.

In an alternative embodiment of the invention, shown in FIG. 6, the raw polyester staple is processed by a carding machine 64, not by a garnetting machine. The use of a carding machine to produce a single web of batting from raw fiber is well known in the art and is, therefore, shown in FIG. 6 in schematic form only. In this embodiment, plumage-dispensing means (such as that illustrated in FIGS. 1 and 7) may be arranged so that the plumage is fed directly into the carding machine 64, together with the polyester staple (not shown). As illustrated in FIG. 6, a plumage-dispensing unit 24' may be mounted on brackets 65 above carding machine 64, and may be rotated by drive means (not shown) to dispense a metered quantity of plumage 30 directly into the carding machine hopper.

The carding machine 64 then processes the polyester fiber and the plumage together, creating a batting 58' having plumage distributed homogeneously therein and integrated therewith. In this alternative embodiment, a needling machine such as that shown in FIGS. 1 and 3 need not be used, since vertical integration of the plumage with the polyester web is accomplished as a by-product of the operation of the carding machine 64. Accordingly, the batting 58' can be advanced directly to a conventional folding apparatus 60' by a conveyor belt 32' and subsequently stored or cut for use in a garment or other article. Conveyor belt 32' is driven in the direction of arrows 34', 36' by rollers 38', 42', at least one of which is rotated by drive means (not shown). The batting 58' which exits from the carding machine 64 is substantially identical with the vertically integrated web 58 produced using the preferred embodiment of the invention, and shown in FIG. 4.

It may be seen from the foregoing that the embodiments described herein are by way of illustration and not of limitation, and that various changes in and other modifications of the apparatus and methods are possible in light of the above teachings. Accordingly, it is to be understood that other embodiments of this invention may be utilized without departing from the spirit and scope of the present invention, as set forth in the appended claims.

I claim:

1. An homogenous insulating composition comprising a plurality of layers of at least one vertically integrated web, each layer of said web comprising waterfowl plumage securely entangled within at least one opened combed layer of polyester batting.

* * * * *